US009805379B2

(12) United States Patent
Wang et al.

(10) Patent No.: US 9,805,379 B2
(45) Date of Patent: Oct. 31, 2017

(54) METHOD AND DEVICE FOR OBTAINING CUSTOMER TRAFFIC DISTRIBUTION

(71) Applicant: BAIDU ONLINE NETWORK TECHNOLOGY (BEIJING) CO., LTD., Beijing (CN)

(72) Inventors: Kaihua Wang, Beijing (CN); Suqi Lin, Beijing (CN); Zhenghai Yuan, Beijing (CN); Huijun Hu, Beijing (CN); Tingru Yin, Beijing (CN)

(73) Assignee: Baidu Online Network Technology (Beijing) Co. Ltd., Beijing (CN)

( * ) Notice: Subject to any disclaimer, the term of this patent is extended or adjusted under 35 U.S.C. 154(b) by 70 days.

(21) Appl. No.: 14/583,019

(22) Filed: Dec. 24, 2014

(65) Prior Publication Data
US 2015/0324812 A1 Nov. 12, 2015

(30) Foreign Application Priority Data
May 8, 2014 (CN) .......................... 2014 1 0194179

(51) Int. Cl.
*H04W 24/00* (2009.01)
*G06Q 30/02* (2012.01)
*H04W 4/02* (2009.01)

(52) U.S. Cl.
CPC ........ *G06Q 30/0201* (2013.01); *H04W 4/023* (2013.01); *H04W 4/027* (2013.01)

(58) Field of Classification Search
CPC ... G08G 1/0145; G08G 1/0125; H04W 4/025; H04W 4/046; H04W 48/04; H04W 4/027; G06Q 50/30; G01S 13/931; G01S 13/91; G06F 17/30241

USPC .......................................... 455/456
See application file for complete search history.

(56) References Cited

U.S. PATENT DOCUMENTS

| | | | |
|---|---|---|---|
| 2009/0243932 A1* | 10/2009 | Moshfeghi | G01S 5/14 342/378 |
| 2012/0115505 A1 | 5/2012 | Miyake et al. | |
| 2013/0226655 A1 | 8/2013 | Shaw | |
| 2014/0122040 A1 | 5/2014 | Marti | |
| 2014/0200805 A1* | 7/2014 | Modica | G01C 21/20 701/466 |

(Continued)

FOREIGN PATENT DOCUMENTS

| | | |
|---|---|---|
| CN | 201142139 Y | 10/2008 |
| CN | 101615207 A | 12/2009 |

(Continued)

OTHER PUBLICATIONS

Chinese Patent Application No. 201410194179.9 Office Action dated May 24, 2016, with English translation, 11 pages.

(Continued)

*Primary Examiner* — Kathy Wang-Hurst
*Assistant Examiner* — Said Elnoubi
(74) *Attorney, Agent, or Firm* — Lathrop Gage LLP

(57) ABSTRACT

A method and a device for obtaining a customer traffic distribution are provided. The method comprises steps of: obtaining position information of mobile terminals; determining at least one cluster center in a preset range and a heat value of each cluster center according to the position information; and generating the customer traffic distribution according to the at least one cluster center and the heat values.

13 Claims, 5 Drawing Sheets

(56) References Cited

U.S. PATENT DOCUMENTS

2015/0382039 A1* 12/2015 Lewis ............... H04N 21/4753
                                                    725/28
2015/0382139 A1* 12/2015 Omar .................. G01S 5/0294
                                                    455/456.1

FOREIGN PATENT DOCUMENTS

| CN | 102063753 A | 5/2011 |
|----|-------------|--------|
| CN | 102238584 A | 11/2011 |
| JP | 2009098446 A | 5/2009 |
| JP | 2010271778 A | 12/2010 |
| JP | 2012174182 A | 9/2012 |
| JP | 2012198870 A | 10/2012 |
| JP | 2012203650 A | 10/2012 |
| JP | 2013121073 A | 6/2013 |
| JP | 2014071540 A | 4/2014 |
| KR | 10-2004-0067533 A | 7/2004 |
| KR | 10-2004-0086061 A | 10/2004 |
| KR | 10-2013-0015336 A | 2/2013 |

OTHER PUBLICATIONS

European Patent Application No. 142001221.1 European Search Report dated Jun. 12, 2015, 6 pages.

Japanese Patent Application No. 2014-262903 Notification of Reasons for Refusal dated Dec. 27, 2015, with English translation, 10 pages.

Korean Patent Application No. 20140193478 Notification of Reason for Refusal dated Jan. 21, 2016, with English Translation, 9 pages.

Korean Patent Application No. 20140193478 Notification of Reason for Refusal dated Jul. 27, 2016, with English Translation, 5 pages.

Korean Patent Application No. 20140193478 Notification of Rejection dated Sep. 28, 2016, with English Translation, 3 pages.

Emerging Technology Review, http://ventureclef.com/blog2/?p=1702, entry posted Jan. 4, 2013., with a partial English translation, 5 pages.

* cited by examiner

METHOD AND DEVICE FOR OBTAINING CUSTOMER TRAFFIC DISTRIBUTION

CROSS-REFERENCE TO RELATED APPLICATION

This application claims priority to and benefits of Chinese Patent Application Serial No. 201410194179.9, filed with the State Intellectual Property Office of P. R. China on May 8, 2014, the entire content of which is incorporated herein by reference.

FIELD

Embodiments of the present disclosure generally relate to a search technology field, and more particularly to a method for obtaining a customer traffic distribution, a device for obtaining a customer traffic distribution and a computer readable storage medium.

BACKGROUND

Customer traffic distribution is always significant to commercial operations. However, it is often difficult to obtain an accurate and efficient customer traffic distribution as the customer traffic distribution is unfixed and repeatable. At present, the customer traffic distribution nearby a business district is mainly obtained through following two methods.

The first method is obtaining a number of customers entering a shopping mall and a number of customers exiting the shopping mall by human observation, in which only the traffic flow but not the customer traffic distribution is obtained, only a limited area of the business district is covered and human cost is high.

The second method is obtaining the customer traffic distribution of the business district through analyzing a video image of the customer traffic taken by an image collection device like a camera, in which only a limited area of the business district (i.e. areas recordable by the camera) is covered, and the recorded result is not visual enough. Therefore, the result needs to be organized manually later.

Above all, results of customer traffic distribution obtained through both above two methods are undesired, as an integral customer traffic distribution could not been obtained, the obtained customer traffic distribution could not be treated in detail according to customer traffic features of the district and the operating cost is high.

SUMMARY

Embodiments of the present disclosure seek to solve at least one of the problems existing in the prior art to at least some extent.

One objective of the present disclosure is to provide a method for obtaining a customer traffic distribution, which can obtain a customer traffic distribution without manually recording, thus reducing the cost, and the obtained customer traffic distribution is combined with a geographical location, thus being more visual and accurate.

Another objective of the present disclosure is to provide a device for obtaining a customer traffic distribution.

According to embodiments of the present disclosure, a method for obtaining a customer traffic distribution is provided. The method comprises steps of: obtaining position information of mobile terminals; determining at least one cluster center in a preset range and a heat value of each cluster center according to the position information; and generating the customer traffic distribution according to the at least one cluster center and the heat value of each cluster center.

With the method according to embodiments of the present disclosure, the position information of the mobile terminals is obtained, the at least one cluster center in the preset range and the heat value of each cluster center are determined according to the position information, and thus a customer traffic distribution of cluster centers in the preset range is determined and a corresponding customer traffic distribution result is generated without manually recording. Therefore, the cost is reduced. Further, the obtained customer traffic distribution result is combined with a geographical location, which is more visual and accurate, thus improving a user experience.

According to embodiments of the present disclosure, a device for obtaining a customer traffic distribution is provided. The device comprises: an obtaining module configured to obtain position information of mobile terminals; a determining module configured to determine at least one cluster center in a preset range and a heat value of each cluster center according to the position information; and a generating module configured to generate the customer traffic distribution according to the at least one cluster center and the heat value of each cluster center.

With the device according to embodiments of the present disclosure, the position information of the mobile terminals is obtained, the at least one cluster center in the preset range and the heat value of each cluster center are determined according to the position information, thus a customer traffic distribution of cluster centers in the preset range is determined and a customer traffic distribution result of the preset range is generated without manually recording. Therefore, the cost is reduced. Further, the obtained customer traffic distribution result is combined with a geographical location, which is more visual and accurate, thus improving a user experience.

According to embodiments of the present disclosure, a computer readable storage medium is provided. The computer readable storage medium includes a computer program for executing the above-identified method for obtaining a customer traffic distribution, when running on a computer.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
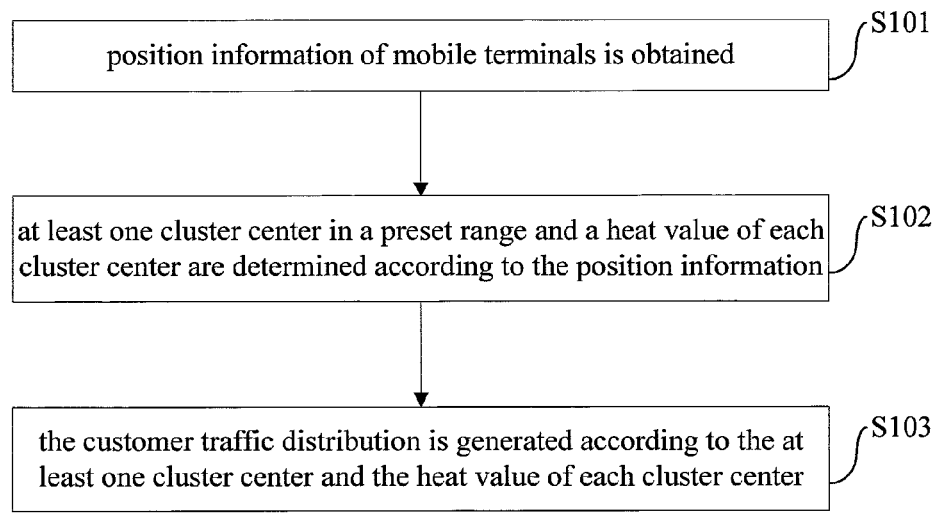
FIG. 1 is a flow chart of a method for obtaining customer traffic distribution according to an embodiment of the present disclosure.

Embodiments of the present disclosure will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure. Contrarily, embodiments of the present disclosure include all the variations, modifications and equivalents within the spirit and scope of the appended claims.

In the following, a method and a device for obtaining customer traffic distribution according to embodiments of the present disclosure will be described in detail with reference to drawings.

FIG. 1 is a flow chart of a method for obtaining customer traffic distribution according to an embodiment of the present disclosure. As shown in FIG. 1, the method comprises the following steps.

At step S101, position information of mobile terminals is obtained.

In some embodiments, the position information of the mobile terminals can be obtained through a Global Positioning System (GPS), position data of a mobile terminal accessing a map client, communication signals of the mobile terminals or other conventional or possible future positioning approaches.

The position information includes all position information and relevant information of users of the mobile terminals, such as a user identity, and position data, a moving speed, a moving direction and a position confidence radius corresponding to the user identity, etc.

At step S102, at least one cluster center in a preset range and a heat value of each cluster center are determined according to the position information.

In some embodiments, a plurality of cluster centers in the preset range and heat values of the cluster centers are determined according to the position information.

The preset range may be a business district divided in advance or other preset districts whose customer traffic distribution needs to be obtained. The size of the preset range is determined according a demand of a user, which is not limited in embodiments of the present disclosure.

In some embodiments, firstly, the position information is de-noised according to the position data to obtain the position information in the preset range. Secondly, position data of users in the preset range is determined according to the position information in the preset range, and the cluster centers in a preset range are determined according to position distribution densities of users in the preset range. Finally, the heat values of cluster centers are determined according to position distribution densities of users in a range of each cluster center respectively, thus a customer traffic distribution density in the range of each cluster center is visually reflected. An implementation of the step S102 will be described in detail in following embodiments.

At step S103, the customer traffic distribution is generated according to the at least one cluster center and the heat value of each cluster center.

In some embodiments, the customer traffic distribution is generated according to a plurality of cluster centers and the heat values of the cluster centers.

In embodiments of the present disclosure, the cluster centers and the heat values of cluster centers may be displayed on a map in different ways (such as displayed on a heat map) to generate the customer traffic distribution.

With the method according to embodiments of the present disclosure, the position information of the mobile terminals is obtained, the at least one cluster center in the preset range and the heat value of each cluster center are determined according to the position information, thus a customer traffic distribution of cluster centers in the preset range is determined and a customer traffic distribution result of the preset range is generated without manually recording. Therefore, the cost is reduced. Further, the obtained customer traffic distribution result is combined with a geographical location, which is more visual and accurate, thus improving a user experience.

Figure 2:
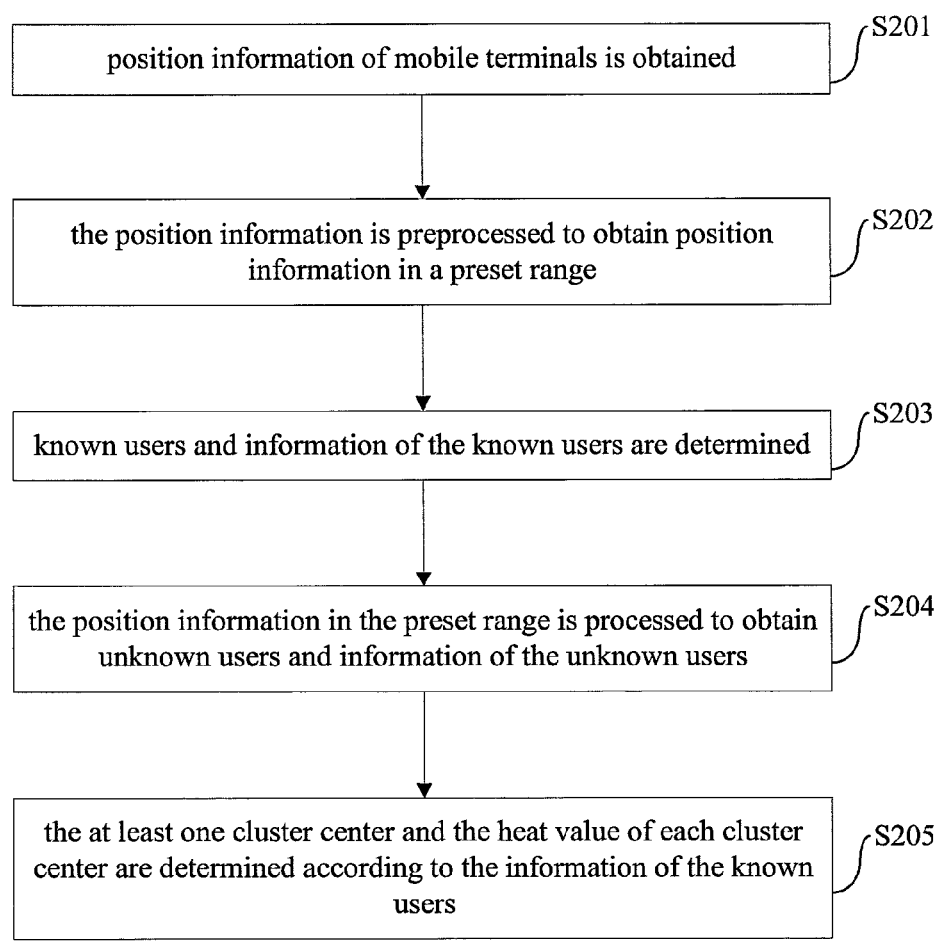
FIG. 2 is a flow chart of a method for obtaining customer traffic distribution according to another embodiment of the present disclosure.

FIG. 2 is a flow chart of a method for obtaining customer traffic distribution according to another embodiment of the present disclosure. As shown in FIG. 2, the method comprises the following steps.

At step S201, position information of mobile terminals is obtained.

In some embodiments, the position information of the mobile terminals can be obtained through a Global Positioning System (GPS), position data of a mobile terminal accessing a map client, communication signals of the mobile terminals or other conventional or possible future positioning approaches.

At step S202, the position information is preprocessed to obtain position information in a preset range.

The position information may include position data, a position confidence radius, etc.

Figure 3:
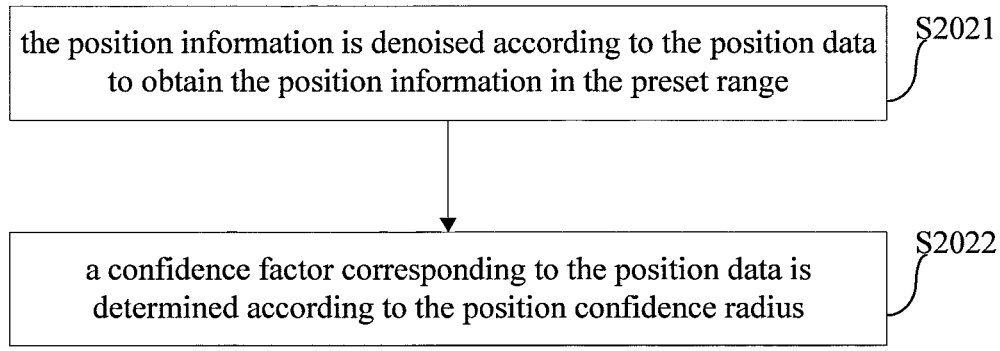
FIG. 3 is a flow chart of preprocessing position information to obtain position information in a preset range according to an embodiment of the present disclosure.

FIG. 3 is a flow chart of preprocessing position information to obtain position information in a preset range (i.e. step S202) according to an embodiment of the present disclosure. As shown in FIG. 3, the step S202 comprises the following detailed steps.

At step S2021, the position information is de-noised according to the position data to obtain the position information in the preset range.

In some embodiments, the position data includes position coordinates of users at the present moment, thus position data in the preset range is filtered out according to the position coordinates.

At step S2022, a confidence factor corresponding to the position data is determined according to the position confidence radius.

For instance, if the position confidence radius is less than 20 m, which represents a high positioning accuracy and a credible positioning result, the confidence factor corresponding to the position data may be defined as 1. If the position confidence radius is larger than 20 m and less than 50 m, which represents a less credible positioning result, the confidence factor corresponding to the position data may be defined as 0.8. If the position confidence radius is larger than 50 m, which represents a biased positioning result, the confidence factor corresponding to the position data may be defined as 0.6.

At step S203, known users and information of the known users are determined.

In embodiments of the present disclosure, the position information further includes a user identity configured to identify a user identification corresponding to each piece of position information, in which each mobile terminal corresponds to one user identity.

In some embodiments, whether a preset database comprises an existing position data corresponding to the user identity is judged according to the user identity. In one embodiment of the present disclosure, the position information of the mobile terminals can be obtained at regular intervals, and the position information corresponding to each user identity is stored in a preset database. After the latest position data is obtained, the preset database is searched according to the user identity in the position information, so as to judge whether a user corresponding to the latest position information is a known user or an unknown user.

In some embodiments, if the preset database comprises the existing position data corresponding to the user identity, a user corresponding to the user identity is determined to be a known user, and a moving speed and a moving direction of the known user are determined according to the position data and the existing position data of the known user.

In some embodiments, the existing position data is updated with the position data of the known user in the preset database, and the position data, the confidence factor corresponding to the known user, the moving speed and the moving direction of the known user are stored in the preset database.

At step S204, the position information in the preset range is processed to obtain unknown users and information of the unknown users.

In some embodiments, data in the preset database is read out at regular intervals to be processed in combination with the latest position information to obtain the unknown users and the information of the unknown users.

Figure 4:
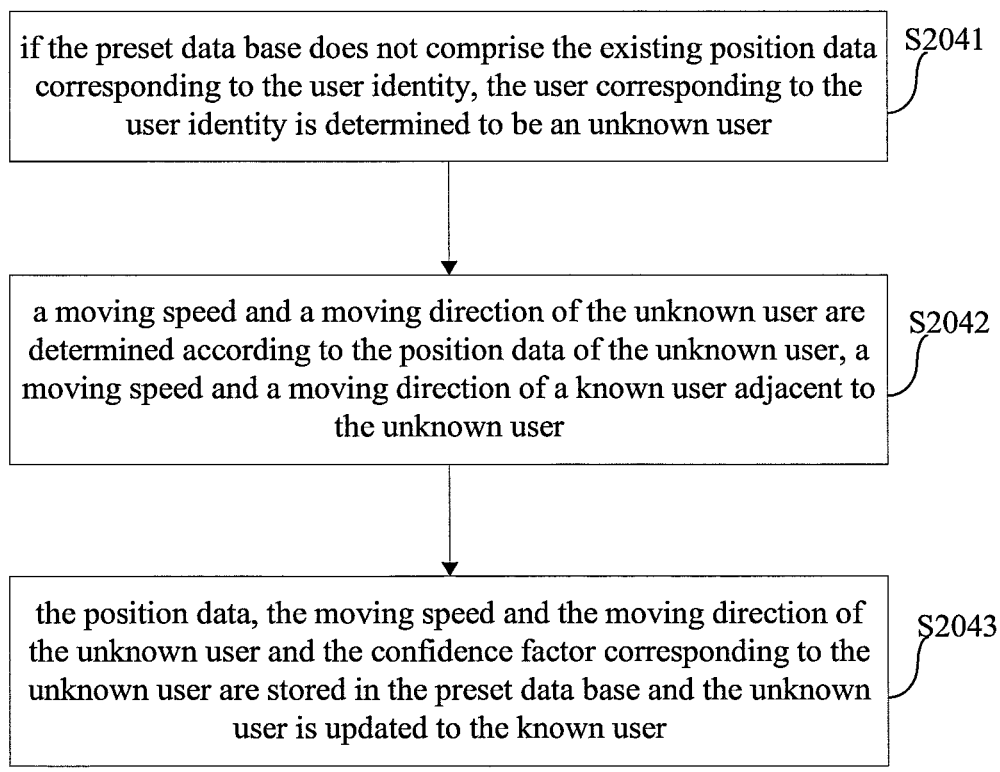
FIG. 4 is a flow chart of processing the position information in the preset range to obtain unknown users and information of the unknown users according to an embodiment of the present disclosure.

FIG. 4 is a flow chart of processing the position information in the preset range to obtain unknown users and information of the unknown users (i.e. step S204) according to an embodiment of the present disclosure. In some embodiments, as shown in FIG. 4, the step S204 comprises the following detailed steps.

At step S2041, if the preset database does not comprise the existing position data corresponding to the user identity, the user corresponding to the user identity is determined to be an unknown user.

At step S2042, a moving speed and a moving direction of the unknown user are determined according to the position data of the unknown user, a moving speed and a moving direction of a known user adjacent to the unknown user.

In some embodiments, the unknown users are divided into vehicle users and walking users, because it is crowded nearby a business district with a great customer traffic flow and complex user types. A character of the walking users is that there is a comfortable moving area (such as a range having a size of 0.4 m×0.4 m) for the users to avoid a collision between adjacent users, and the user may go ahead following a forward crowd going in a same direction and having a relatively larger user number. Thus the moving speed and the moving direction of the unknown user may be predicted by following steps.

In some embodiments, the preset range is divided into grids of preset size respectively. In an embodiment of the present disclosure, a business district with a preset range of 10 m×10 m, for instance, is divided into 625 adjacent grids each having a size of 0.4 m×0.4 m.

In some embodiments, a grid the unknown user is located in is determined according to the position data of the unknown user, and moving speeds and moving directions of known users in grids adjacent to the grid the unknown user is located in are obtained.

Figure 5:
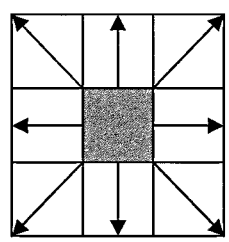
FIG. 5 is a schematic diagram of a user collision grid according to an embodiment of the present disclosure.

In an embodiment of the present disclosure, a user collision grid is shown in FIG. 5, which includes 9 grids each having a size of 0.4 m×0.4 m. Moving directions of the users include eight directions: up, down, left, right, upper left, lower left, upper right and lower right. The unknown user is in a central grid, and other eight grids adjacent to the central grid represent the above eight directions respectively.

It should be noticed that, the preset range may be divided in other ways, which is not limited in embodiments of the present disclosure.

In some embodiments, if a moving speed of a known user in one of the grids adjacent to the grid the unknown user is located in is larger than a maximum speed of walking, the known user in the one of the grids adjacent to the grid the unknown user is located in may be defined as a vehicle user, and the unknown user and the known user in the one of the grids adjacent to the grid the unknown user is located in may be defined as moving by taking a same vehicle. Thus the moving speed and the moving direction of the known user in the one of the grids adjacent to the grid the unknown user is located in are determined to be the moving speed and the moving direction of the unknown user respectively. In some embodiments, if there is more than one known user having a moving speed larger than the maximum speed of walking in the grids adjacent to the grid the unknown user is located in and these known users have a same moving speed and a same moving direction, the moving speed and the moving direction of the known users may be determined to be the moving speed and the moving direction of the unknown user.

Figure 6:
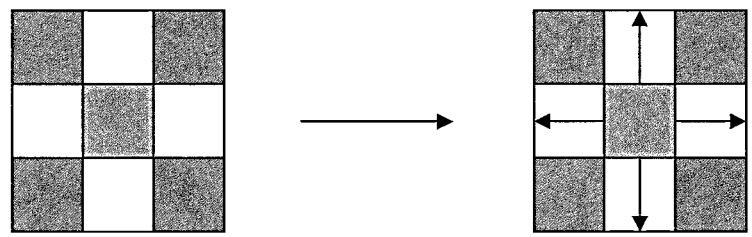
FIG. 6 is a schematic diagram of determining a movable direction of the unknown user according to an embodiment of the present disclosure.

In some embodiments, if none of the moving speeds of the known users in the grids adjacent to the grid the unknown user is located in is larger than the maximum speed of walking, the unknown user may be defined as a walking user. Thus a movable direction of the unknown user is determined according to the position data of the known users in the grids adjacent to the grid the unknown user is located in. In some embodiments, if a known user is located in one of the grids adjacent to the grid the unknown user is located in, a direction that the one grid represents may not be the moving direction of the unknown user, while grids adjacent to the grid the unknown user is located in and having no user therein may represent movable directions of the unknown user. In an embodiment, as shown in FIG. 6, a gray grid in the center has the unknown user therein, 4 dark gray grids have 4 known users adjacent to the unknown user therein respectively, and 4 white grids have no user therein. Directions corresponding to the 4 white grids may be defined as the movable directions of the unknown user, while directions corresponding to the 4 dark gray grids are not the moving direction of the unknown user.

In some embodiments, the moving speed and the moving direction of the unknown user is determined according to the movable direction, moving speeds and moving directions of the known users in the preset range.

In some embodiments, if the movable direction is one direction, the movable direction is determined to be the moving direction of the unknown user, an average speed is calculated according to speeds of known users with a same moving direction with the movable direction in the preset range, and the average speed is determined to be the moving speed of the unknown user.

In some embodiments, if the movable direction includes at least two (for example, two) directions, a number of known users in each movable direction in the preset range is determined, a movable direction corresponding to a largest number of known users is obtained, the movable direction corresponding to the largest number of known users is determined to be the moving direction of the unknown user, an average speed according to speeds of the largest number of known users is calculated, and the average speed is determined to be the moving speed of the unknown user.

At step S2043, the position data, the moving speed and the moving direction of the unknown user and the confidence factor corresponding to the unknown user are stored in the preset database and the unknown user is updated to the known user.

At step S205, the at least one cluster center and the heat value of each cluster center are determined according to the information of the known users.

In some embodiments, a plurality of cluster centers and the heat values of the cluster centers are determined according to the information of the known users.

In some embodiments, firstly, users in the preset range are clustered according to the information of the known users (which has been updated according to a latest result) to obtain the cluster centers. Then the heat values of the cluster centers may be calculated, in which the heat value represents a heat degree of one position, which visually reflects information such as a customer traffic flow, customer density and the like.

In an embodiment of the present disclosure, the at least one cluster center is determined according to the position data of the known users.

For instance, the position data of the known users can be clustered according to a geographical location by algorithms (such as a single-pass algorithm) to obtain cluster center points which represent corresponding cluster centers respectively. The single-pass algorithm is a conventional algorithm mainly including the following steps.

At step A, a linked list of the positioning point and a linked list of the cluster center point are built according to the location data of users in a database.

At step B, the linked list of the positioning point and the linked list of the cluster center point are traversed.

At step C, if the linked list of cluster center point is not empty and a distance between a coordinate of a cluster center point being currently traversed (center_x, center_y) and a current positioning point coordinate (x, y) is less than a preset distance (such as 100 meters), the current positioning point (x, y) is clustered into a cluster corresponding to the cluster center point being currently traversed, a position number of the cluster is increased by 1, and the cluster center point coordinate (center_x', center_y') of the cluster is calculated according to coordinates of all positioning points in the cluster.

At step D, if the linked list of cluster center point is empty, a positioning point being currently traversed is defined as a new cluster center point, a coordinate of the cluster center point is recorded as (x, y), and a position number of a cluster corresponding to the cluster center point is defined as 1.

At step E, if a cluster center point of the current positioning point in the preset range has not been obtained after the linked list of the cluster center point is traversed, the current positioning point is defined as a new cluster center point, a coordinate of the cluster center point is recorded as (x, y), and a position number of a cluster corresponding to the cluster center point is defined as 1.

With above steps, the cluster centers in the preset range are finally obtained after a preset number of cluster center point calculations. It should be understood that ways for determining cluster centers according to embodiments of the preset disclosure include, but are not limited to, the single-pass algorithm in the present disclosure.

In some embodiments, central counts of cluster centers are determined according to confidence factors corresponding to users in a range of each cluster center respectively. In an embodiment of the present disclosure, the confidence factors corresponding to users in a range of one cluster center are added up to obtain the central count of the cluster center (recorded as "count").

In some embodiments, moving speeds of the cluster centers are determined according to an average speed of users in the range of each cluster center respectively. The average speed of users in the range of one cluster center is the moving speed of the cluster center (recorded as "V").

In some embodiments, the heat value (recorded as "HOT") of each cluster center are determined according to the central count of each cluster center (recorded as "count") and the moving speed of each cluster center (recorded as "V"), reference of which may be made with the following formula:

$$V_{\_max}=1.5 \text{ m/s},$$

$$\text{Factor}=3.0,$$

$$\text{and HOT}=\text{count}*(1+(V_{\_max}-V)*V_{max})/\text{Factor},$$

in which $V_{\_max}$ is the maximum speed of walking, and "Factor" is a weight adjusting factor.

At step S206, a customer traffic distribution is generated according to the at least one cluster center and the heat value of each cluster center.

In some embodiments, the customer traffic distribution is generated according to a plurality of cluster centers and heat values of the cluster centers.

In some embodiments of the present disclosure, the cluster centers and the heat values of the cluster centers may be displayed on a map in different ways to generate the customer traffic distribution. For example, different customer intensities are displayed in different colors and/or in different color shades on a map to generate a heat map.

Figure 7:
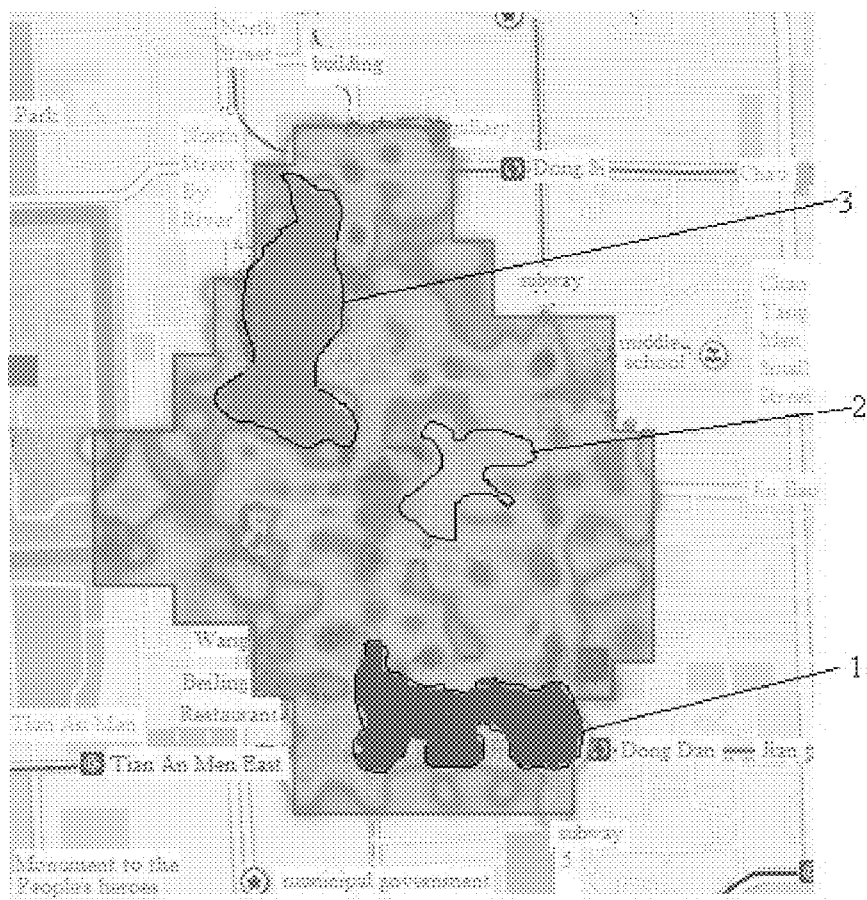
FIG. 7 is a schematic diagram of a heat map of customer traffic distribution of Wanfujing district, Beijing, China, obtained by using a method for obtaining a customer traffic distribution according to an embodiment of the present disclosure.

For instance, FIG. 7 is a schematic diagram of a heat map of customer traffic distribution of Wanfujing district, Beijing, China, obtained by using a method for obtaining a customer traffic distribution according to an embodiment of the present disclosure. As shown in FIG. 7, area 1 represents a high customer density, area 2 represents a low customer density, and area 3 represents a customer density between the high customer density and the low customer density. It should be understood that, the area 1, area 2 and area 3 are only explanatory in the embodiments, while other implementing manners may be also be used in the present disclosure. The heat map in FIG. 7 is only a possible way for displaying a customer traffic distribution in an embodiment of the present disclosure. There may be some other ways for displaying the customer traffic distribution, such as displaying in different colors (not shown) or displaying in different color shades, without particular limits in the present disclosure.

With the method according to embodiments of the present disclosure, the position information, the moving speeds, the moving directions, the moving states and other information of the users in the preset range are obtained according to the position information of the mobile terminals, and the at least one cluster center in the preset range and thenheat value of each cluster center are determined according to position distribution of the users, thus a customer traffic distribution of cluster centers in the preset range is determined and a customer traffic distribution result of the preset range is generated without manually recording. Therefore, the cost is reduced. Further, the obtained customer traffic distribution result is combined with a geographical location, which is more visual and accurate, thus improving a user experience.

Embodiments of the present disclosure further provide a device for obtaining customer traffic distribution.

Figure 8:
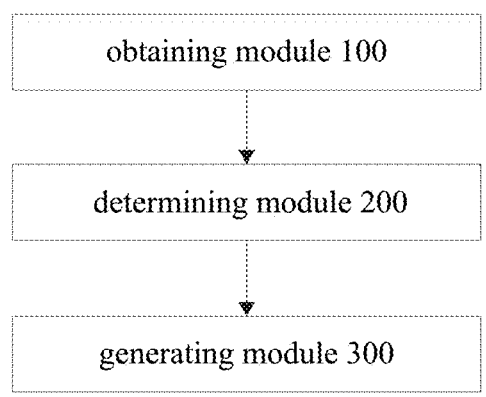
FIG. 8 is a block diagram of a device for obtaining customer traffic distribution according to an embodiment of the present disclosure.

FIG. 8 is a block diagram of a device for obtaining customer traffic distribution according to an embodiment of the present disclosure. As shown in FIG. 8, the device comprises an obtaining module 100, a determining module 200 and a generating module 300.

In some embodiments, the obtaining module 100 is configured to obtain position information of mobile terminals.

In some embodiments, the obtaining module 100 can obtain the position information of the mobile terminals through a Global Positioning System (GPS), position data of a mobile terminal accessing a map client, communication signals of the mobile terminals or other conventional or possible future positioning approaches.

In some embodiments, the position information includes all position information and relevant information of users of the mobile terminals, such as a user identity, and position data, a moving speed, a moving direction and a position confidence radius corresponding to the user identity, etc.

The determining module 200 is configured to determine at least one cluster center in a preset range and a heat value of each cluster center according to the position information. In some embodiments, the determining module 200 may determine a plurality of cluster centers in a preset range and heat values of the cluster centers according to the position information.

The preset range may be a business district divided in advance or other preset districts whose customer traffic distribution needs to be obtained. The size of the preset range is determined according a demand of a user, which is not limited in embodiments of the present disclosure.

The determining module 200 may de-noise the position information according to the position data to obtain the position information in the preset range, determine position data of users in the preset range according to the position information in the preset range, and determine the cluster centers in a preset range according to position distribution densities of users in the preset range, and finally determine the heat values of the cluster centers according to position distribution densities of users in a range of each cluster center respectively. Thus, the position distribution density of users in the range of each cluster center may be visually reflected.

The generating module 300 is configured to generate the customer traffic distribution according to the at least one cluster center and the heat value of each cluster center. For example, the generating module 300 may generate the customer traffic distribution according to the plurality of cluster centers and heat values of the cluster centers.

In some embodiments of the present disclosure, the generating module 300 may display the cluster centers and the heat values of cluster centers on a map in different ways (such as display on a heat map) to generate the customer traffic distribution. For example, the generating module 300 displays different customer densities in different colors and/or in different color shades on a map to generate a heat map.

For instance, FIG. 7 is a schematic diagram of a heat map of a customer traffic distribution of Wanfujing district, Beijing, China, obtained by using a method for obtaining a customer traffic distribution according to an embodiment of the present disclosure. As shown in FIG. 7, area 1 represents a high customer density, area 2 represents a low customer density, and area 3 represents a customer density between the high customer density and the low customer density. It should be understood that the area 1, area 2 and area 3 are only explanatory in the embodiments, while other implementing manners may be also be used in the present disclosure. The heat map in FIG. 7 is only a possible way for displaying a customer traffic distribution in an embodiment of the present disclosure. There may be some other ways for displaying the customer traffic distribution, such as displaying in different colors (not shown) or displaying in different color shades, without particular limits in the present disclosure.

With the device according to embodiments of the present disclosure, the position information of the mobile terminals is obtained, the at least one cluster center in the preset range and the heat value of each cluster center are determined according to the position information, thus a customer traffic distribution of cluster centers in the preset range is determined and a customer traffic distribution result of the preset range is generated without manually recording. Therefore, the cost is reduced. Further, the obtained customer traffic distribution result is combined with a geographical location, which is more visual and accurate, thus improving a user experience.

Figure 9:
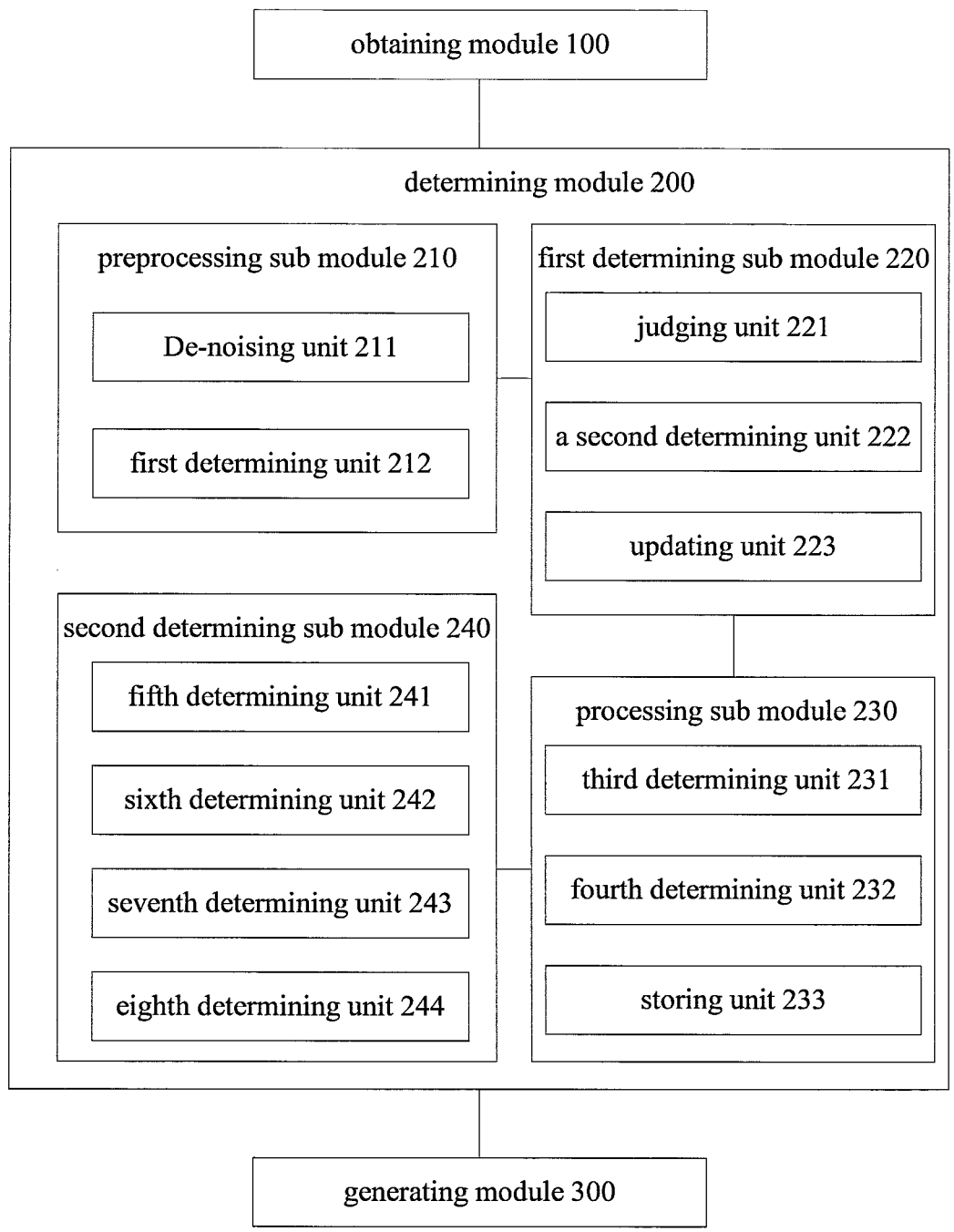
FIG. 9 is a block diagram of a device for obtaining customer traffic distribution according to another embodiment of the present disclosure.

FIG. 9 is a block diagram of a device for obtaining a customer traffic distribution according to another embodiment of the present disclosure. As shown in FIG. 9, the device comprises an obtaining module 100, a determining module 200, a preprocessing sub module 210, a de-nosing unit 211, a first determining unit 212, a first determining sub module 220, a judging unit 221, a second determining unit 222, an updating unit 223, a processing sub module 230, a third determining unit 231, a fourth determining unit 232, a storing unit 233, a second determining sub module 240, a fifth determining unit 241, a sixth determining unit 242, a seventh determining unit 243, an eighth determining unit 244 and a generating module 300. In some embodiments, the determining module 200 comprises the preprocessing sub module 210, the first determining sub module 220, the processing sub module 230 and the second determining sub module 240. In some embodiments, the preprocessing sub module 210 comprises the de-noising unit 211 and the first determining unit 212. In some embodiments, the first determining sub module 220 comprises the judging unit 221, the second determining unit 222 and the updating unit 223. In some embodiments, the processing sub module 230 comprises the third determining unit 231, the fourth determining unit 232 and the storing unit 233. In some embodiments, the second determining sub module 240 comprises the fifth determining unit 241, the sixth determining unit 242, the seventh determining unit 243 and the eighth determining unit 244.

In some embodiments, the preprocessing sub module 210 is configured to preprocess the position information to obtain position information in a preset range. The position information may include position data, a position confidence radius, etc.

In some embodiments, the preprocessing sub module 210 comprises the de-noising unit 211 and the first determining unit 212.

The de-noising unit 211 is configured to de-noise the position information according to the position data to obtain the position information in the preset range. The position data includes position coordinates of users at the present moment, thus the de-noising unit 211 can filter out position data in the preset range according to the position coordinates.

The first determining unit 212 is configured to determine a confidence factor corresponding to the position data according to the position confidence radius.

For instance, if the position confidence radius is less than 20 m, which represents a high positioning accuracy and a credible positioning result, the first determining unit 212 may define the confidence factor corresponding to the position data as 1. If the position confidence radius is larger than 20 m and less than 50 m, which represents a less credible positioning result, the first determining unit 212 may define the confidence factor corresponding to the position data as 0.8. If the position confidence radius is larger than 50 m, which represents a biased positioning result, the first determining unit 212 may define the confidence factor corresponding to the position data as 0.6.

The first determining sub module 220 is configured to determine known users and information of the known users.

In some embodiments of the present disclosure, the position information further includes a user identity configured to identify a user identification corresponding to each piece of position information, in which each mobile terminal corresponds to one user identity.

In some embodiments, the first determining sub module 220 comprises the judging unit 221, second determining unit 222 and the updating unit 223.

The judging unit 221 is configured to judge whether a preset database comprises an existing position data corresponding to the user identity. In one embodiment of the present disclosure, the position information the mobile terminals can be obtained at regular intervals, and the position information corresponding to each user identity is stored in a preset database. After a latest position information is obtained, the judging unit 221 may search the preset database to judge whether a user corresponding to the latest position information is a known user or an unknown user.

If the preset database comprises the existing position data corresponding to the user identity, the second determining unit 222 may determine a user corresponding to the user identity to be a known user, and may determine a moving speed and a moving direction of the known user according to the position data and the existing position data of the known user. Then the updating unit 223 may update the existing position data with the position data of the known user in the preset database, and stores the position data, the confidence factor corresponding to the known user, the moving speed and the moving direction of the known user in the preset database.

The processing sub module 230 is configured to process the position information in the preset range to obtain unknown users and information of the unknown users. In some embodiments, the processing sub module 230 reads out data in the preset database at regular intervals to obtain a read data and processes the read data in combination with the latest position information, so as to obtain the unknown users and the information of the unknown users. The processing sub module 230 comprises the third determining unit 231, the fourth determining unit 232 and the storing unit 233.

The third determining unit 231 is configured to determine the user corresponding to the user identity to be an unknown user if the preset database does not comprise the existing position data corresponding to the user identity.

The fourth determining unit 232 is configured to determine a moving speed and a moving direction of the unknown user according to the position data of the unknown user, a moving speed and a moving direction of a known user adjacent to the unknown user.

In some embodiments, the fourth determining unit 232 divides the unknown users are into vehicle users and walking users, because it is crowded nearby a business district with a great customer traffic flow and complex user types. A character of the walking users is that there is a comfortable moving area (such as a range having a size 0.4 m x 0.4 m) for the users to avoid a collision between adjacent users, and the user may go ahead following a forward crowd going in a same direction and having a relatively larger user umber. Thus the fourth determining unit 232 may predict the moving speed and the moving direction of the unknown user with following steps.

In some embodiments, the preset range is divided into grids of preset size respectively. In an embodiment of the present disclosure, a business district with a preset range of 10 m×10 m, for instance, is divided into 625 adjacent grids each having a size of 0.4 m×0.4 m.

In some embodiments, a grid the unknown user is located in is determined according to the position data of the unknown user, and moving speeds and moving directions of known users in grids adjacent to the grid the unknown user is located in are obtained.

In an embodiment of the present disclosure, a user collision grid is shown in FIG. 5, which includes 9 grids each having a size of 0.4 m×0.4 m. Moving directions of the users include eight directions: up, down, left, right, upper left, lower left, upper right and lower right. The unknown user is in a central grid, and other eight grids adjacent to the central grid represent the above eight directions respectively.

It should be noticed that, the preset range may be divided in other ways, which is not limited in embodiments according to the present disclosure.

In some embodiments, if a moving speed of a known user in one of the grids adjacent to the grid the unknown user is located inuser is located in is larger than a maximum speed of walking, the known user in the one of the grids adjacent to the grid the unknown user is located in may be defined as a rider, and the unknown user and the known user in the one of the grids adjacent to the grid the unknown user is located in may be defined as moving by taking a same vehicle. Thus the fourth determining unit 232 may determine the moving speed and the moving direction of the known user in the one of the grids adjacent to the grid the unknown user is located in to be the moving speed and the moving direction of the unknown user. In some embodiments, if there is more than one known user having a moving speed larger than the maximum speed of walking in the grids adjacent to the grid the unknown user is located in and these known users have a same moving speed and a same moving direction, the fourth determining unit 232 may determine the moving speed and the moving direction of the known users to be the moving speed and the moving direction of the unknown user.

In some embodiments, if none of the moving speeds of the known users in the grids adjacent to the grid the unknown user is located in is larger than the maximum speed of walking, the unknown user may be defined as a walking user. Thus the fourth determining unit 232 may determine a movable direction of the unknown user according to the position data of the known users in the grids adjacent to the grid the unknown user is located in. In some embodiments, if a known user is located in one of the grids adjacent to the grid the unknown user is located in, a direction that the one grid represents may not be the moving direction of the unknown user, while grids adjacent to the grid the unknown user is located in and having no user therein may represent movable directions of the unknown user. In an embodiment, as shown in FIG. 6, a gray grid in the center has the unknown user therein, 4 dark gray grids have 4 known users adjacent to the unknown user therein respectively, and 4 white grids have no user therein. Directions corresponding to the 4 white grids may be defined as the movable directions of the unknown user, while directions corresponding to the 4 dark gray grids are not the moving direction of the unknown user.

In some embodiments, the fourth determining unit 232 may determine the moving speed and the moving direction of the unknown user according to the movable direction, moving speeds and moving directions of the known users in the preset range.

In some embodiments, if the movable direction is one direction, the fourth determining unit 232 is further configured to determine the movable direction to be the moving direction of the unknown user, to calculate an average speed according to speeds of known users with a same moving direction with the movable direction in the preset range, and to determine the average speed to be the moving speed of the unknown user.

In some embodiments, if the movable direction includes at least two (for example, two) directions, the fourth determining unit 232 is further configured to determine a number of known users in each movable direction in the preset range, to obtain a movable direction corresponding to a largest number of known users, to determine the movable direction corresponding to the largest number of known users to be the moving direction of the unknown user, to calculate an average speed according to speeds of the largest number of known users, and to determine the average speed to be the moving speed of the unknown user.

The storing unit 233 is configured to store the position data, the moving speed and the moving direction of the unknown user and the confidence factor corresponding to the unknown user in the preset database.

The second determining sub module 240 is configured to determine the at least one cluster center and the heat value of each cluster center according to the information of the known users. For example, the second determining sub module 240 may determine a plurality of cluster centers and heat values of the cluster centers according to the information of the known users.

In some embodiments, the second determining sub module 240 clusters users in the preset range according to the information of the known users (which has been updated according to a latest result) to obtain the cluster centers, then calculates the heat values of the cluster centers, in which the heat value represents a heat degree of one position, which visually reflects information such as a customer traffic flow, customer density and the like.

The fifth determining unit 241 is configured to determine the at least one cluster center according to the position data of the known users. For example, the fifth determining unit 241 may determine a plurality of cluster centers according to the position data of the known users.

In an embodiment of the present disclosure, the fifth determining unit 241 can cluster the position data of the known users according to geographical location to obtain cluster center points which represent the cluster centers respectively. For instance, the fifth determining unit 241 can cluster the position data of the known users by algorithms (such as a single-pass algorithm). The single-pass algorithm is a conventional algorithm mainly including the following steps.

At step A, a linked list of the positioning point and a linked list of the cluster center point are built according to the location data of users in a database.

At step B, the linked list of the positioning point and the linked list of the cluster center point are traversed.

At step C, if the linked list of cluster center point is not empty and a distance between a coordinate of a cluster center point being currently traversed (center_x, center_y) and a current positioning point coordinate (x, y) is less than a preset distance (such as 100 meters), the current positioning point (x, y) is clustered into a cluster corresponding to the cluster center point being currently traversed, a position number of the cluster is increased by 1, and the cluster center point coordinate (center_x', center_y') of the cluster is calculated according to coordinates of all positioning points in the cluster.

At step D, if the linked list of cluster center point is empty, a positioning point being currently traversed is defined as a new cluster center point, a coordinate of the cluster center point is recorded as (x, y), and a position number of a cluster corresponding to the cluster center point is defined as 1.

At step E, if a cluster center point of the current positioning point in the preset range has not been obtained after the linked list of the cluster center point is traversed, the current positioning point is defined as a new cluster center point, a coordinate of the cluster center point is recorded as (x, y), and a position number of a cluster corresponding to the cluster center point is defined as 1.

With above steps, the cluster centers in the preset range are finally obtained after a preset number of cluster center point calculations.

The sixth determining unit 242 is configured to determine central counts of cluster centers according to confidence factors corresponding to users in a range of each cluster center respectively. In an embodiment of the present disclosure, the confidence factors corresponding to users in a range of a cluster center are added up to obtain the central count of the cluster center (recorded as "count"). Then the seventh determining unit 243 may determine moving speeds of the cluster centers according to an average speed of users in the range of each cluster center respectively. The average speed of users in the range of one cluster center is the moving speed of the cluster center (recorded as V).

The eighth determining unit 244 is configured to determine the heat value of each cluster center (recorded as "HOT") according to central count of each cluster center (recorded as "count") and the moving speed of each cluster center (recorded as "V"), reference of which may be made with the following formula:

$$V_{max}=1.5 \text{ m/s},$$

$$\text{Factor}=3.0,$$

$$\text{and HOT}=\text{count}*(1+(V_{max}-V)*V_{max})/\text{Factor},$$

in which $V_{max}$ is the maximum speed of walking, and "Factor" is a weight adjusting factor.

With the device according to embodiments of the present disclosure, the position information, the moving speeds, the moving directions, the moving states and other information of the users in the preset range are obtained according to the position information of the mobile terminals, and the at least one cluster center in the preset range and the heat value of each cluster center are determined according to position distribution of the users, thus a customer traffic distribution of cluster centers in the preset range is determined and a customer traffic distribution result of the preset range is generated without manually recording. Therefore, the cost is reduced. Further, the obtained customer traffic distribution result is combined with a geographical location, which is more visual and accurate, thus improving a user experience.

Embodiments of the present disclosure further provide a computer readable storage medium. The computer readable storage medium includes a computer program for executing the above-identified method for obtaining a customer traffic distribution, when running on a computer.

It is to be understood that, in the description of the present disclosure, terms of "first" and "second" are only used for description and cannot be seen as indicating or implying relative importance. Furthermore, unless otherwise explained, it is to be understood that a term of "a plurality of" refers to two or more.

Any procedure or method described in the flow charts or described in any other way herein may be understood to comprise one or more modules, portions or parts for storing executable codes that realize particular logic functions or procedures. Moreover, advantageous embodiments of the present disclosure comprises other implementations in which the order of execution is different from that which is depicted or discussed, including executing functions in a substantially simultaneous manner or in an opposite order according to the related functions. This should be understood by those skilled in the art which embodiments of the present disclosure belong to.

It is understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the phrases throughout this specification are not necessarily referring to the same embodiment or example of the present disclosure. Furthermore, the particular features, structures, materials, or characteristics may be combined in any suitable manner in one or more embodiments or examples.

It is to be understood that phraseology and terminology used herein (such as, terms like "center", "longitudinal", "lateral", "length", "width", "thickness", "up", "down", "front", "rear", "left", "right", "top", "bottom", "inside", "outside", "vertical", "horizontal", "clockwise" and "counterclockwise") are only used to simplify description of the present invention, and do not indicate or imply that the device or element referred to must have or operated in a particular orientation. They cannot be seen as limits to the present disclosure.

Unless otherwise stipulated and restricted, it is to be explained that terms of "linkage" and "connection" shall be understood broadly, for example, it could be mechanical connection or electrical connection; it could be direct linkage, indirect linkage via intermediate medium. Those skilled in the art shall understand the concrete notations of the terms mentioned above according to specific circumstances.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure

What is claimed is:

1. A method for obtaining a customer traffic distribution, comprising steps of:
obtaining position information of mobile terminals, wherein the position information comprises position data, a position confidence radius and a user identity;
determining at least one cluster center in a preset range and a heat value of each cluster center according to the position information, comprising:
preprocessing the position information to obtain position information in the preset range by denoising the position information according to the position data to obtain the position information in the preset range; and determining a confidence factor corresponding to the position data according to the position confidence radius,
determining known users and information of the known users by: judging whether a preset data base comprises an existing position data corresponding to the user identity; when the preset data base comprises the existing position data corresponding to the user identity, determining a user corresponding to the user identity to be a known user, and determining a moving speed and a moving direction of the known user according to the position data and the existing position data of the known user; and updating the existing position data with the position data of the known user in the preset data base, and storing the position data, the confidence factor corresponding to the known user, the moving speed and the moving direction of the known user in the preset data base, and determining the at least one cluster center and the heat value of each cluster center according to the information of the known users; and, generating the customer traffic distribution according to the at least one cluster center and the heat value of each cluster center.

2. The method of claim 1, wherein determining at least one cluster center in a preset range and a heat value of each cluster center according to the position information further comprises:

processing the position information in the preset range to obtain unknown users and information of the unknown users comprising:

when the preset data base does not comprise the existing position data corresponding to the user identity, determining the user corresponding to the user identity to be an unknown user;

determining a moving speed and a moving direction of the unknown user according to the position data of the unknown user, a moving speed and a moving direction of a known user adjacent to the unknown user; and storing the position data, the moving speed and the moving direction of the unknown user and the confidence factor corresponding to the unknown user in the preset data base and updating the unknown user to the known user.

3. The method of claim 2, wherein determining a moving speed and a moving direction of the unknown user according to the position data of the unknown user, a moving speed and a moving direction of a known user adjacent to the unknown user comprises:

dividing the preset range into grids of preset size respectively;

determining a grid the unknown user located in according to the position data of the unknown user, and obtaining moving speeds and moving directions of known users in grids adjacent to the grid the unknown user located in; and when a moving speed of a known user in one of the grids adjacent to the grid the unknown user located in is larger than a maximum speed of walking, determining the moving speed and the moving direction of the known user in the one of the grids adjacent to the grid the unknown user located in to be the moving speed and the moving direction of the unknown user.

4. The method of claim 3, wherein determining a moving speed and a moving direction of the unknown user according to the position data of the unknown user, a moving speed and a moving direction of a known user adjacent to the unknown user further comprises:

when none of the moving speeds of the known users in the grids adjacent to the grid the unknown user located in is larger than the maximum speed of walking, determining a movable direction of the unknown user according to the position data of the known users in the grids adjacent to the grid the unknown user located in; and determining the moving speed and the moving direction of the unknown user according to the movable direction, moving speeds and moving directions of the known users in the preset range.

5. The method of claim 4, wherein determining the moving speed and the moving direction of the unknown user according to the movable direction, moving speeds and moving directions of the known users in the preset range comprises:

when the movable direction is one direction, determining the movable direction to be the moving direction of the unknown user, calculating an average speed according to speeds of known users with a same moving direction with the movable direction in the preset range, and determining the average speed to be the moving speed of the unknown user; or when the movable direction is at least two directions, determining a number of known users in each movable direction in the preset range, obtaining a movable direction corresponding to a largest number of known users, determining the movable direction corresponding to the largest number of known users to be the moving direction of the unknown user, calculating an average speed according to speeds of the largest number of known users, and determining the average speed to be the moving speed of the unknown user.

6. The method of claim 1, wherein determining the at least one cluster center and the heat value of each cluster center according to the information of the known users comprises:

determining the at least one cluster center according to the position data of the known users;

determining central counts of cluster centers according to confidence factors corresponding to users in a range of each cluster center respectively;

determining moving speeds of the cluster centers according to an average speed of users in the range of each cluster center respectively; and determining the heat value of each cluster center according to the central counts and the moving speeds of the cluster centers respectively.

7. A device for obtaining customer traffic distribution, comprising:

a processing circuit;

a memory configured to store an instruction executable by the processing circuit;

wherein the processing circuit is configured to:

obtain position information of mobile terminals, wherein the position information comprises position data, a position confidence radius and a user identity;

determine at least one cluster center in a preset range and a heat value of each cluster center according to the position information;

wherein the processing circuit is configured to determine at least one cluster center in a preset range and a heat value of each cluster center according to the position information by acts of:

preprocessing the position information to obtain position information in the preset range by denoising the position information according to the position data to obtain the position information in the preset range; and determining a confidence factor corresponding to the position data according to the position confidence radius, determining known users and information of the known users by: judging whether a preset data base comprises an existing position data corresponding to the user identity; when the preset data base comprises the existing position data corresponding to the user identity, determining a user corresponding to the user identity to be a known user, and determining a moving speed and a moving direction of the known user according to the position data and the existing position data of the known user; and updating the existing position data with the position data of the known user in the preset data base, and storing the position data, the confidence factor corresponding to the known user, the moving speed and the moving direction of the known user in the preset data base; and determining the at least one cluster center and the heat value of each cluster center according to the information of the known users; and, generate the customer traffic distribution according to the at least one cluster center and the heat value of each cluster center.

8. The device of claim 7, wherein the processing circuit is configured to determine at least one cluster center in a preset range and a heat value of each cluster center according to the position information by acts of processing the position information in the preset range to obtain unknown users and information of the unknown users comprising:

when the preset data base does not comprise the existing position data corresponding to the user identity, determining the user corresponding to the user identity to be an unknown user;

determining a moving speed and a moving direction of the unknown user according to the position data of the unknown user, a moving speed and a moving direction of a known user adjacent to the unknown user; and storing the position data, the moving speed and the moving direction of the unknown user and the confidence factor corresponding to the unknown user in the preset data base and updating the unknown user to the known user.

9. The device of claim 8, wherein the processing circuit is configured to determine a moving speed and a moving direction of the unknown user according to the position data of the unknown user, a moving speed and a moving direction of a known user adjacent to the unknown user by acts of dividing the preset range into grids of preset size respectively;

determining a grid the unknown user located in according to the position data of the unknown user, and obtaining moving speeds and moving directions of known users in grids adjacent to the grid the unknown user located in; and when a moving speed of a known user in one of the grids adjacent to the grid the unknown user located in is larger than a maximum speed of walking, determining the moving speed and the moving direction of the known user in the one of the grids adjacent to the grid the unknown user located in to be the moving speed and the moving direction of the unknown user.

10. The device of claim 9, wherein the processing circuit is configured to determine a moving speed and a moving direction of the unknown user according to the position data of the unknown user, a moving speed and a moving direction of a known user adjacent to the unknown user by acts of when none of the moving speeds of the known users in the grids adjacent to the grid the unknown user located in is larger than the maximum speed of walking, determining a movable direction of the unknown user according to the position data of the known users in the grids adjacent to the grid the unknown user located in; and determining the moving speed and the moving direction of the unknown user according to the movable direction, moving speeds and moving directions of the known users in the preset range.

11. The device of claim 10, wherein the processing circuit is configured to determine the moving speed and the moving direction of the unknown user according to the movable direction, moving speeds and moving directions of the known users in the preset range by acts of:

when the movable direction is one direction, determining the movable direction to be the moving direction of the unknown user, calculating an average speed according to speeds of known users with a same moving direction with the movable direction in the preset range, and determining the average speed to be the moving speed of the unknown user; or when the movable direction is at least two directions, determining a number of known users in each movable direction in the preset range, obtaining a movable direction corresponding to a largest number of known users, determining the movable direction corresponding to the largest number of known users to be the moving direction of the unknown user, calculating an average speed according to speeds of the largest number of known users, and determining the average speed to be the moving speed of the unknown user.

12. The device of claim 7, wherein the processing circuit is configured to determine the at least one cluster center and the heat value of each cluster center according to the information of the known users by acts of:

determining the at least one cluster center according to the position data of the known users;

determining central counts of cluster centers according to confidence factors corresponding to users in a range of each cluster center respectively;

determining moving speeds of the cluster centers according to an average speed of users in the range of each cluster center respectively; and determining the heat value of each cluster center according to the central counts and the moving speeds of the cluster centers respectively.

13. A non-transitory computer readable storage medium, comprising a computer program executed by the processing circuit for executing steps of:

obtaining position information of mobile terminals, wherein the position information comprises position data, a position confidence radius and a user identity;

determining at least one cluster center in a preset range and a heat value of each cluster center according to the position information, comprising:

preprocessing the position information to obtain position information in the preset range by denoising the position information according to the position data to obtain the position information in the preset range; and determining a confidence factor corresponding to the position data according to the position confidence radius, determining known users and information of the known users by: judging whether a preset data base comprises an existing position data corresponding to the user identity; when the preset data base comprises the existing position data corresponding to the user identity, determining a user corresponding to the user identity to be a known user, and determining a moving speed and a moving direction of the known user according to the position data and the existing position data of the known user; and updating the existing position data with the position data of the known user in the preset data base, and storing the position data, the confidence factor corresponding to the known user, the moving speed and the moving direction of the known user in the preset data base, and, determining the at least one cluster center and the heat value of each cluster center according to the information of the known users;

generating the customer traffic distribution according to the at least one cluster center and the heat value of each cluster center, when running on a computer.

* * * * *